United States Patent
Lee et al.

(10) Patent No.: US 7,130,360 B2
(45) Date of Patent: Oct. 31, 2006

(54) APPARATUS AND METHOD FOR RECEIVING DIGITAL SIGNAL

(75) Inventors: Seung-Hwan Lee, Taejon (KR); Kim Eung Bae, Taejon (KR); Shin Eun-Jeong, Choongchungbuk-Do (KR)

(73) Assignee: Electronics and Telecommunications Research Institute (KR)

( * ) Notice: Subject to any disclaimer, the term of this patent is extended or adjusted under 35 U.S.C. 154(b) by 793 days.

(21) Appl. No.: 10/293,317

(22) Filed: Nov. 13, 2002

(65) Prior Publication Data

US 2003/0235257 A1 Dec. 25, 2003

(30) Foreign Application Priority Data

Jun. 20, 2002 (KR) ...................... 10-2002-0034471

(51) Int. Cl.
*H04L 27/22* (2006.01)

(52) U.S. Cl. ...................................... 375/316; 375/362

(58) Field of Classification Search ................ 375/316, 375/324, 326, 342, 354, 365, 366, 362; 370/503, 370/512, 513–514
See application file for complete search history.

(56) References Cited

U.S. PATENT DOCUMENTS

| 5,970,092 A | 10/1999 | Currivan |
| 5,995,572 A | 11/1999 | Dettmar |
| 6,181,755 B1 * | 1/2001 | Junell .......................... 375/362 |
| 6,330,291 B1 | 12/2001 | Agrawal et al. |
| 6,654,413 B1 * | 11/2003 | Shimoda ...................... 375/232 |
| 6,944,241 B1 * | 9/2005 | Oh .............................. 375/321 |

FOREIGN PATENT DOCUMENTS

JP 08-317007 11/1996

* cited by examiner

*Primary Examiner*—Khanh Tran
(74) *Attorney, Agent, or Firm*—Blakely Sokoloff Taylor & Zafman (57) ABSTRACT

A receiving apparatus and method for a synchronizing process in the digital communication system is disclosed. A receiving apparatus includes: a A/D converting unit for performing an over-sampling process and outputting over-sampled points; a sample classifying unit for classifying the over-sampled points; a integration unit for integrating classified symbol values; a symbol synchronizing unit for selecting a point of symbol synchronization; a frequency estimating unit for estimating a frequency error; and a digital demodulating unit for demodulating values outputted from the symbol synchronizing unit and the frequency estimating unit to a signal. The present invention can simplify a configuration of the apparatus and reduce an amount of parameter-control. Moreover, the present invention can be used in a burst mode of a digital communication system.

15 Claims, 8 Drawing Sheets

APPARATUS AND METHOD FOR RECEIVING DIGITAL SIGNAL

FIELD OF THE INVENTION

The present invention relates to a digital communication system; and, more particularly, to an apparatus and method for receiving a digitally modulated signal in the burst communication system.

Description of Related Arts

Synchronization is a core process in the digital communication system since a successful synchronization must be preceded all other processes for transmitting and receiving data between a transmitter and a receiver. Therefore, many apparatus and methods have been proposed for developing and improving the synchronization process. Recently, a digital technique for signal processing has been incredibly developed and it has led to replace various analog signal processing.

Likely, a conventional analog-synchronization process has been tried to be replaced by a digital-synchronization process.

At first, problems of the conventional symbol synchronization process are discussed as follows for helping to understand objects of the present invention.

Methods for symbol synchronization can be divided into two major methods according to a waveform type.

A first method synchronizes symbols by using a return-to-zero (RZ) waveform in which zero-crossing occurs within one symbol interval. A clock timing signal is included in the RZ. The receiver synchronizes the symbols based on the zero-crossing within one symbol interval. However, the above-mentioned method decreases an efficiency of frequency.

For overcoming the disadvantage of the first method, a second method using a nonreturn-to-zero (NRZ) waveform is announced. Since the clock timing signal is not transmitted with the waveform, the second method has a good efficiency of frequency, however, it requires an additional synchronization circuit. One of the well-known synchronization methods using the NRZ waveform is called as an early-late gate method. The early-late gate method synchronizes symbols by comparing values outputted from two integrators (an early integrator and a late integrator) having a small time difference within one symbol interval. In the early-late gate method, a closed-loop method is used for synchronizing symbols and it requires a complicated parameter control. According to the selected parameter, a performance and a reliability of the closed-loop are varied. Therefore, there can be a lot of problems to implement the early-late gate method.

For overcoming the problem of the early-late gate method, some methods were proposed. "Method for clock synchronization of a signal receiver" U.S. Pat. No. 4,794,624, issued to Walter Braun et al., on Dec. 27, 1998, (hereinafter Walter's patent) and "Apparatus and method for recovering a time varying signal using multiple sampling points" U.S. Pat. No. 5,241,545, issued to Henry L et al., on Sep. 31, 1993, (hereinafter Henry's patent) are disclosed. Walter and Henry teach an over-sampling method without using the closed-loop control. Walter teaches a demodulated received signal is sampled in each of the subintervals over N time windows having in each case K subintervals, wherein N and K are a natural number greater than 0. For providing an object of the Walter's patent, the Walter's patent includes an arithmetic circuit, a memory, a summing circuit and a comparator. In the Henry's patent, a signal including first and second codewords is received and stored. First and second sampling points are determined corresponding to the first and second codewords, respectively. A portion of the signal is recovered responsive to at least one of the determined first and second sampling points. Therefore, for providing an object of the Henry's patent, the Henry's patent includes a data buffer, a sampling point processor, a magnitude buffer, a complex correlator and a coherent detector. As mentioned above, the cited patents 101 and 102 increase a complexity of hardware. Also, the above-mentioned additional circuits decrease a processing speed, therefore, the cited patents 101 and 102 may not be suitable for high-speed data transmission.

Moreover, the Walter's patent must previously assume a sign of received symbol for the synchronization and it decreases a performance caused by a noise. The Henry's patent also decrease a performance of synchronization in a selective fading channel since it must use a special synchronization code for calculating a correlation coefficient.

In a mean time, various digital synchronization methods have been recently proposed.

"Adaptively equalized burst receiver and method for upstream broadband data" U.S. Pat. No. 5,970,092 issued to Bruce Currivan, et al., on Jul. 25, 1997 (hereinafter cited patent 103) teaches a digital mode receiver for the reception of signals from multiple independent subscribers and two-way data transmission. In the Henry's patent, a received burst is sampled and fed to a sample storage buffer. A preamble of which length is very short is used to initialize an equalizer, and to synchronize carrier and modulation clock. By repeating the processing of the preamble and optionally all or part of each burst, accuracy of detection of the variable data is improved, so that it is feasible to receive individual bursts without burst-to-burst coordination, while using a short preamble for efficiency. For providing an object of the cited invention 103, a digital mode receiver includes many additional circuits such as sample storage buffer, a preamble matched filter, an adaptive equalizer and a phase lock loop. The above-mentioned additional circuits increase complexity of hardware and also decrease a process speed of the apparatus so the apparatus of the cited patent 103 can be hardly applied to a real-time calculation.

"Method for measuring frequency shift in digital communications using synchronization sequence and channel step response" U.S. Pat. No. 5,995,572, issued to Uwe Dettmar et al. on Feb. 19, 1997 (hereinafter cited patent 104) teaches a process for demodulation of a receiving signal that contains, besides data to be transmitted, a preset synchronization sequence. In the cited patent 104, at least two non-overlapping partial sequences of the synchronization sequence are picked off. Using a least-square process, the coefficients of the channel step response at each observation window are determined. The frequency shift, in the form of a phase rotation per symbol, is estimated. In other word, the cited patent 104 estimates a frequency error by calculating two or more correlation values between the preamble sequence and received signal and comparing those values.

The above-mentioned cited patents 101 to 104 include a plurality of additional devices for controlling frequency and synchronizing symbols. As a result, the apparatus of the cited patents 101 to 104 become complicated. A performance of the cited patents 101 to 104 could not be reliable since there are mass amount of parameters for individually controlling additional devices. Moreover, some proposed apparatus and method couldn't be applied in a burst mode digital communication system.

SUMMARY OF THE INVENTION

It is, therefore, an object of the present invention to provide an apparatus and method for receiving a digital signal in order to considerably reduce a parameter of synchronization by using a common pre-processor of synchronizing frequencies and symbols, thereby reducing a size of a receiver.

It is another object of the present invention to provide an apparatus and method for receiving a digital signal, which can be used in a burst mode of a digital communication system.

In accordance with an aspect of the present invention, there is provided a receiving apparatus of a digital communication system, including: an A/D converting unit for performing an over-sampling process to convert an analog signal inputted from a transmitter to a digital signal and outputting over-sampled symbols; a sample classifying unit for classifying the over-sampled symbols of which phases are the same based on a phase of the over-sampled symbol in a symbol interval and outputting classified symbols; an integrating unit for accumulating values of the classified symbols by adding each value of the classified symbols for a predetermined time and outputting integrated values; a symbol synchronizing unit for selecting a point of symbol synchronization based on the integrated values and the classified symbols and outputting a first value of the point of symbol synchronization; phase estimating unit for estimating a phase error based on the first value and outputting a second value of an estimated phase error; a frequency estimating unit for estimating a frequency error based on the second value and outputting a third value of an estimated frequency error; and a digital demodulating unit for performing demodulation by using the first value, the second value and the third value to a certain type of signal.

In accordance with an aspect of the present invention, there is also provided a receiving method for a digital communication system, including the steps of: a) performing an over-sampling process to convert an analog signal inputted from a transmitter to a digital signal and outputting over-sampled symbols; b) classifying the over-sampled symbols of which phases are the same based on a phase of the over-sampled symbol in a symbol interval and outputting classified symbols; c) accumulating values of the classified symbols by adding each value of the classified symbols for a predetermined time and outputting integrated values; d) selecting a point of symbol synchronization based on the integrated values and the classified symbols and outputting a fourth value of the point of symbol synchronization; e) estimating a phase error based on the first value and outputting a fifth value of an estimated phase error to the digital demodulating unit; f) estimating a frequency error based on the second value and outputting a sixth value of an estimated frequency error; and g) performing demodulation by using the fourth value, the fifth value and the sixth value to a certain type of signal.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter.

Figure 1:
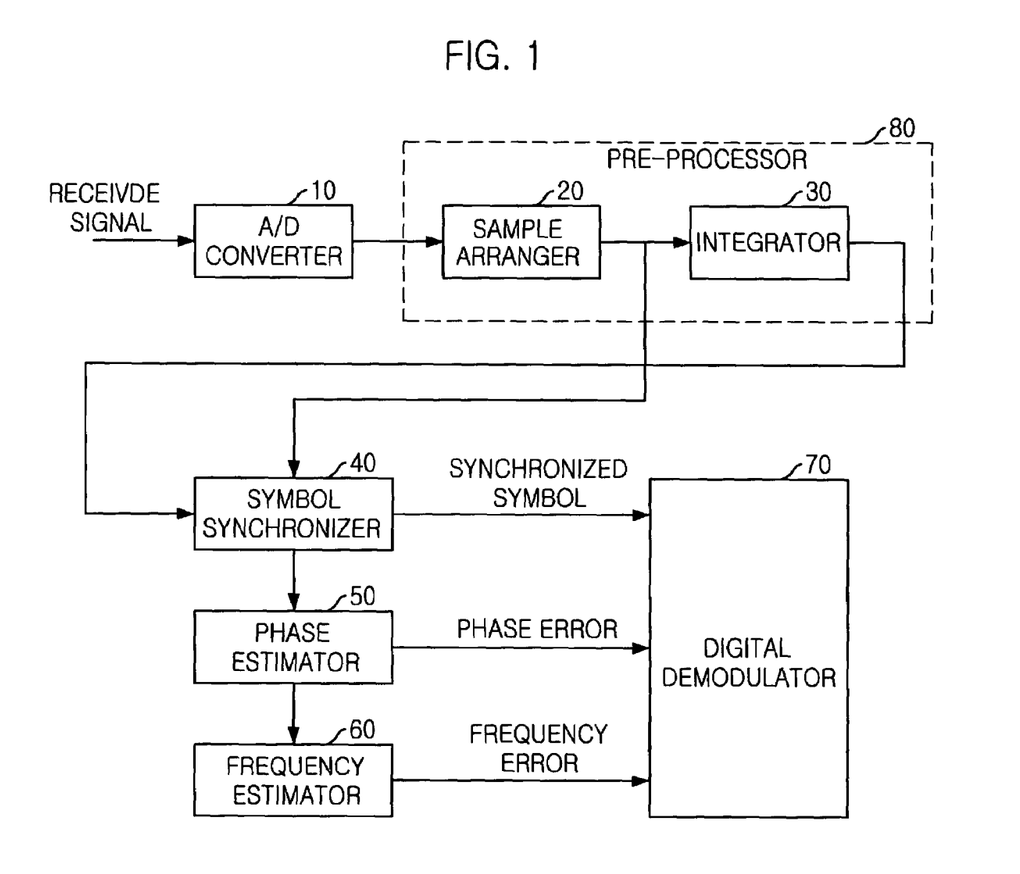
FIG. 1 is a diagram illustrating a receiver of a digital communication system in accordance with a preferred embodiment of the present invention.

FIG. 1 is a diagram illustrating a receiver apparatus of a digital communication system in accordance with a preferred embodiment of the present invention.

Referring to FIG. 1, the receiver apparatus includes an A/D converter 10, a pre-processor 80, a symbol synchronizer 40, a phase estimator 50, a frequency estimator 60 and a digital demodulator 70, wherein the pre-processor 80 contains a sample arranger 20 and an integrator 30.

The A/D converter 10 converts an analog signal to a digital discrete signal and performs an over-sampling process for sampling two or more samples within one symbol interval. A sampling frequency of the A/D converter 10 is a major factor of a performance of synchronization. That is, if the sampling frequency of the A/D converter 10 is high, then symbols are more minutely synchronized and the performance of the synchronization is improved. The A/D converter 10 outputs over-sampled symbols.

The sample arranger 20 receives the over-sampled symbols from the A/D converter 10 and classifying the over-sampled symbols of which phases are the same based on a phase of the over-sampled symbols. In other words, the over-sampled symbols are classified into a first sample group, a second sample group, . . . , and $N^{th}$ sample group in a case that N over-samplings are performed. Each sample group contains the over-sampled symbols in one symbol cycle and is a set of the samples having the same phase. The sample arranger 20 outputs classified symbols.

The integrator 30 receives the classified symbols and accumulates values of the classified symbols by adding each value of the classified symbols for a predetermined time. And the integrator 30 outputs integrated values. The predetermined time for integration must be N times of a symbol interval, wherein N is a natural number. A reason of integration is as follows.

Noises are always existed in the communication system and the noises are major factor affecting a performance of the communication system. Also, in the digital communication system, the over-sampled symbols always include not only desired signals but also the noise. However, a mean value of additional noise is 0 and amplitude of noise depends on a variance. That is, a sampled value at a certain point may have a value more than 0 but if the sampled value is added during a predetermined number of symbol intervals, a mean value of noises affecting to a signal level can be ignored. Therefore, the noise affection can be ignored to determine the received signal. A noise power is always exist without considering of integration and affects the performance as a signal-to-noise ratio. In other words, the symbol integrator 30 performs a function of a low pass filter (LPF) corresponding to a loop filter used in a conventional closed loop control method.

The symbol synchronizer 40 is used for selecting a point of synchronization of symbol based on the integration values and the classified samples. After selecting the point of synchronization of symbol, the symbol synchronizer 40 outputs a first value of the point of synchronization.

The phase estimator 50 estimates a phase error based on the first values and outputs an estimated phase error.

The frequency estimator 60 estimates a frequency error by monitoring the estimated phase error.

The digital demodulator 70 receives output signals from the symbol synchronizer 40, the phase estimator 50 and the frequency estimator 60 and demodulates the output signals to a desired demodulated signal.

The receiver of the present invention can be used in a burst mode communication system, which uses a packet having a preamble and data and it is explained in detail with a preferred embodiment as follows. At first, it assumes that a packet interval is more than 0.

For effectively synchronizing symbols and frequencies in a receiver, a sequence of a preamble used in a transmitter is very important. The sequence of the preamble should be selected suitably for estimating the error of the symbol synchronization, the phase error and the frequency error.

At first, for the symbol synchronization in the receiver, it is important to select a sequence for easily distinguishing from the error of the symbol synchronization. A sine wave is simple and easy to find a point of the maximum value so the error is easily distinguished in the sine wave. Also, the possibility of detection can be increased without considering a channel or a radio frequency (RF) system since the sine wave has excellent characteristic according to a nonlinear characteristic generated at the channel or an analog radio frequency (RF).

Conventional receiver uses a different oscillator from that of the transmitter, so there is the frequency error. The symbols are usually synchronized under existence of the frequency error.

Therefore, for synchronizing symbols without considering the frequency error, the preamble is transmitted as only one side of a phase and a phase variation needs to be detected at the receiver for canceling the phase variation.

Figure 2:
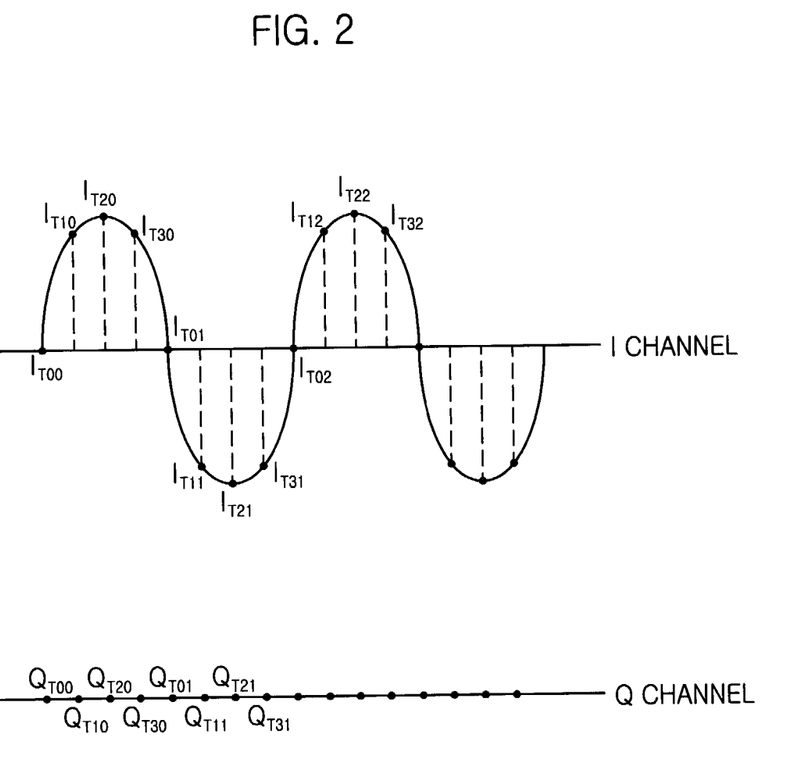
FIG. 2 is a graph showing waveforms of a preamble sequence used in a digital communication system for explaining a principle of a symbol synchronizer in accordance with the present invention.

The above-mentioned principle is used for estimating the frequency error and the phase error. FIG. 2 shows a preamble used in a transmitter side as considering the above-mentioned principle.

FIG. 2 is a graph showing waveforms of a preamble sequence used in a digital communication system for explaining a principle of a symbol synchronizer in accordance with the present invention.

As shown in FIG. 2, if only I-channel signal is transmitted based on a sine wave, a symbol synchronization, a frequency error and a phase error can be easily detected at a receiver.

Figure 3A:
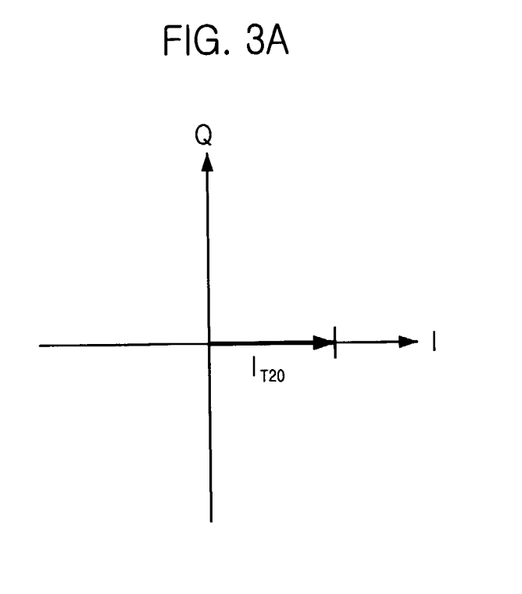
FIG. 3A is a graph depicting constellations of the preamble in FIG. 2 with the x-axis representing I-channel and y-axis representing the Q-channel.

FIG. 3A is a coordinate plane depicting constellations of the preamble in FIG. 2 with the x-axis representing I-channel and y-axis representing the Q-channel.

Referring to FIG. 3A, a point $I_{T20}$ is selected as a symbol synchronization, and synchronization of the frequency and phase are calculated by a rate of a phase variation and a phase value of the preamble which is represented as a sine wave at the receiver.

Figure 3B:
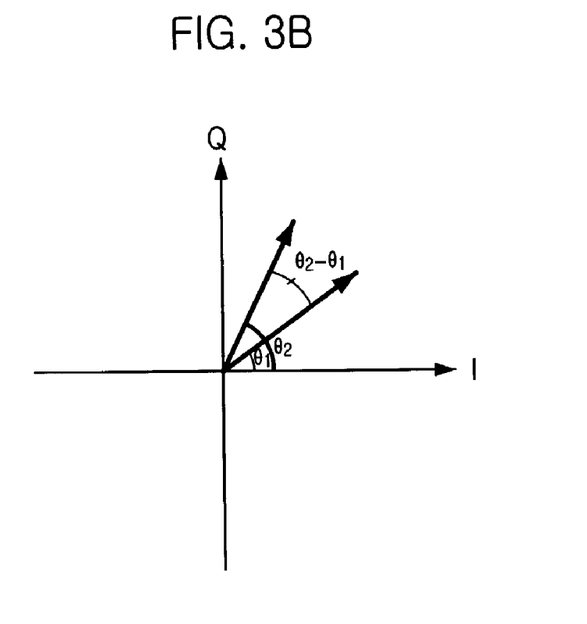
FIG. 3B is a graph showing constellations of a phase of received preamble at a receiver in case that there are a frequency error and a phase error.
Figure 3C:
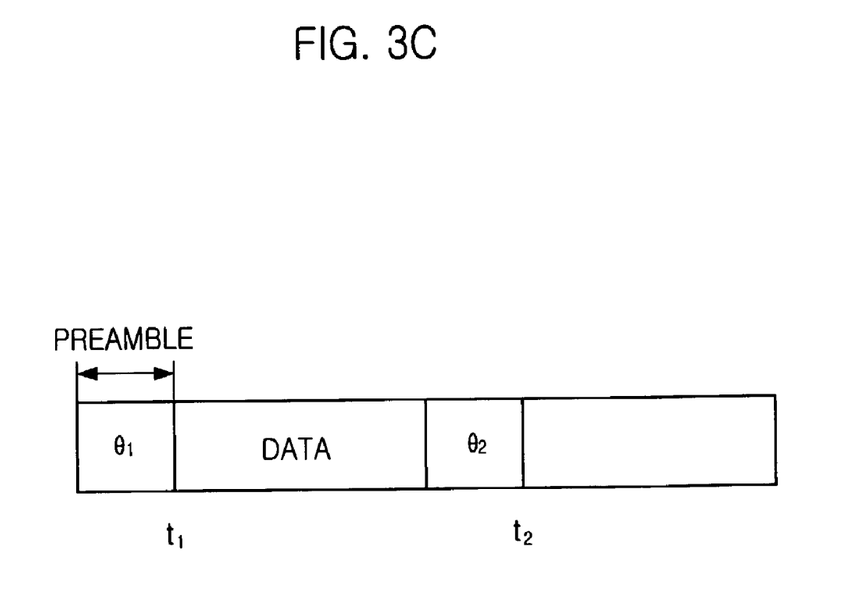
FIG. 3C is a diagram explaining a concept of estimating frequency error in accordance of the present invention.

FIG. 3B is a coordinate plane showing constellations of a phase of a received preamble at the receiver. The received preamble includes not only a desired preamble but also a frequency error and a phase error. Although a phase of the preamble may be changed by a frequency error, an absolute value of the preamble is not changed. Therefore, it is possible to synchronize the symbols if the absolute value of the preamble is calculated. Also, in a case that the phase of the I-channel preamble is sent and projected to the I-channel and Q-channel, the phase value and the frequency error value can be calculated by using a complex value of the preamble. For example, referring to FIG. 3C, if times t1 and t2 of two preambles two phases are $\theta_1$ and $\theta_2$ are obtained, the frequency error can be calculated by using a following equation.

$$\Delta f = \frac{d\theta}{dt} \approx \frac{\theta_2 - \theta_1}{t_2 - t_1} \qquad \text{Eq. 1}$$

Figure 4:
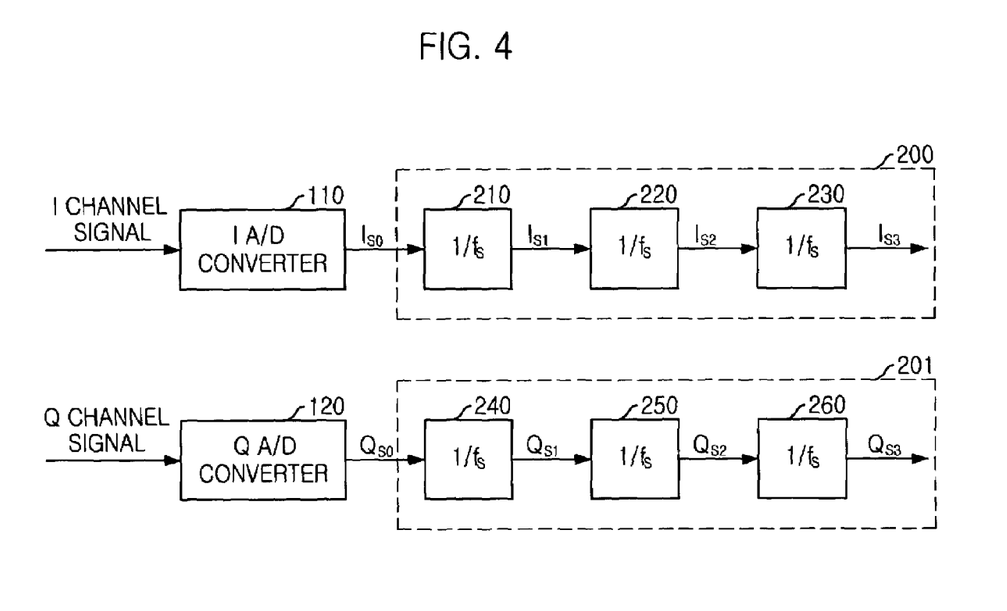
FIG. 4 is a detailed diagram illustrating an A/D converter 10 and a sample arranger 20 of FIG. 1 in accordance with a preferred embodiment of the present invention.

FIG. 4 is a detailed diagram illustrating the A/D converter 10 and the sample arranger 20 of FIG. 1 in accordance with a preferred embodiment of the present invention. In the present invention, two A/D converters and two sample arrangers are individually used for an I-channel and a Q-channel because of preventing a frequency error and a phase error. An I A/D converter 110 and an I-sample arranger 200 are used for the I-channel and a Q A/D converter 120 and a Q-sample arranger used for the Q-channel. The I-sample arranger and the Q-sample arranger include a plurality of delayers.

For explaining the preferred embodiment, it assumes that an over-sampling rate is 4. That is, there are four sampled values in a symbol.

Signals, which are divided to an I-channel signal and a Q-channel signal in a radio frequency circuit and an analog circuit, are inputted to an I A/D converter 110 and a Q A/D converter 120. The I A/D converter 110 and the Q A/D converter 120 output over-sampled symbols and the over-sampled symbols are inputted to delay units 210 to 260. Each delay unit delays the over-sampled symbol as much as a sample interval. The delay units 210 to 260 output values of {IS0, IS1, IS2, IS3} and {QS0, QS1, QS2, QS3} according to each phase of the over-sampled symbol in a symbol interval.

Figure 5:
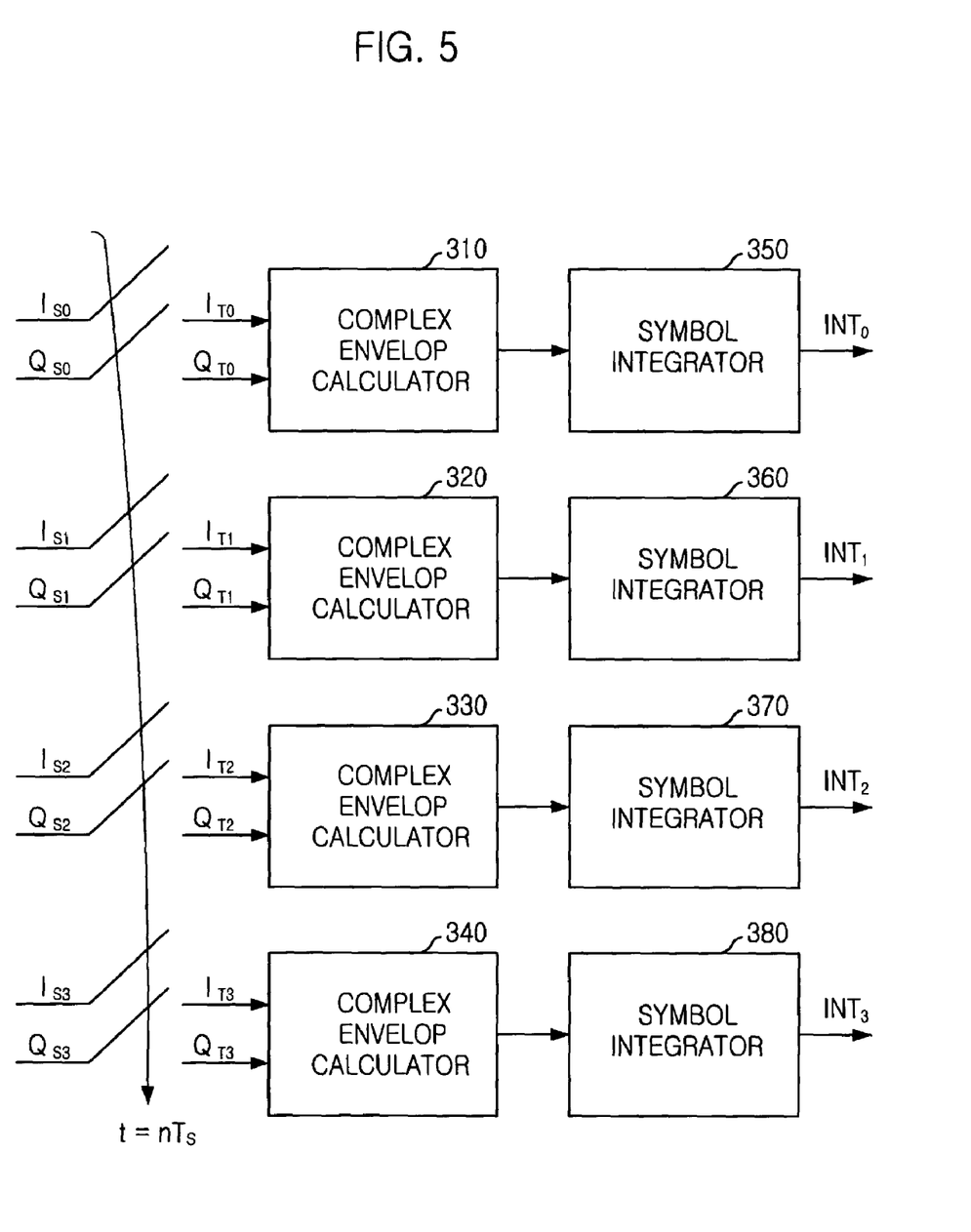
FIG. 5 is a detailed diagram showing an integrator 30 of FIG. 1 in accordance with a preferred embodiment of the present invention.

FIG. 5 is a diagram showing the integrator 30 of FIG. 1 in accordance with a preferred embodiment of the present invention.

Referring to FIG. 5, the integrator 30 includes a plurality of complex envelop calculators 310 to 340 for calculating an absolute value of the over-sampled symbols of the I-channel and the Q-channel outputted from the sample arranger 20 and a plurality of symbol integrators 350 to 380 for accumulating the absolute values outputted from the complex envelop calculators 310 to 340 by adding the absolute values for a predetermined time and outputting integrated values.

For eliminating an affection caused by a phase variation, a integration is performed according to each phase of over-sampled symbols after calculating the absolute value of a complex number corresponding to each of the output values {IS0, IS1, IS2, IS3} and {QS0, QS1, QS2, QS3} of FIG. 4. It will be described a procedure of eliminating the affection caused by the phase variation based on the absolute value of the complex number.

At first, a transmission preamble is expressed by below equation 2.

$$p(t) = \sin \omega_p t \quad \text{Eq. 2}$$

If there is no channel attenuation, an output of I-channel can be expressed as below equation 3 in case a frequency error is exited in the receiver.

$$r_I(t) = p(t)\cos(\Delta\tilde{\omega}t + \theta) = \sin \tilde{\omega}_p t \cdot \cos(\Delta\tilde{\omega}t + \theta) \quad \text{Eq. 3}$$

An output of Q-channel can be expressed as below equation 5.

$$r_Q(t) = p(t)\sin(\Delta\tilde{\omega}t + \theta) = \sin \tilde{\omega}_p t \cdot \sin(\Delta\tilde{\omega}t + \theta) \quad \text{Eq. 4}$$

An output of the complex envelope calculator 310 can be expressed below equation.

$$\sqrt{r_I^2(T_0) + r_Q^2(T_0)} = \sqrt{\sin\omega_p T_0 \cdot \{\cos^2(\Delta\varpi T_0 + \theta) + \sin^2(\Delta\varpi T_0 + \theta)\}}$$
$$= \sqrt{\frac{1 - \cos 2\omega_p T_0}{2}} \quad \text{Eq. 5}$$

As shown in Eq. 5, the affection caused by the frequency and phase error is eliminated.

Figure 6:
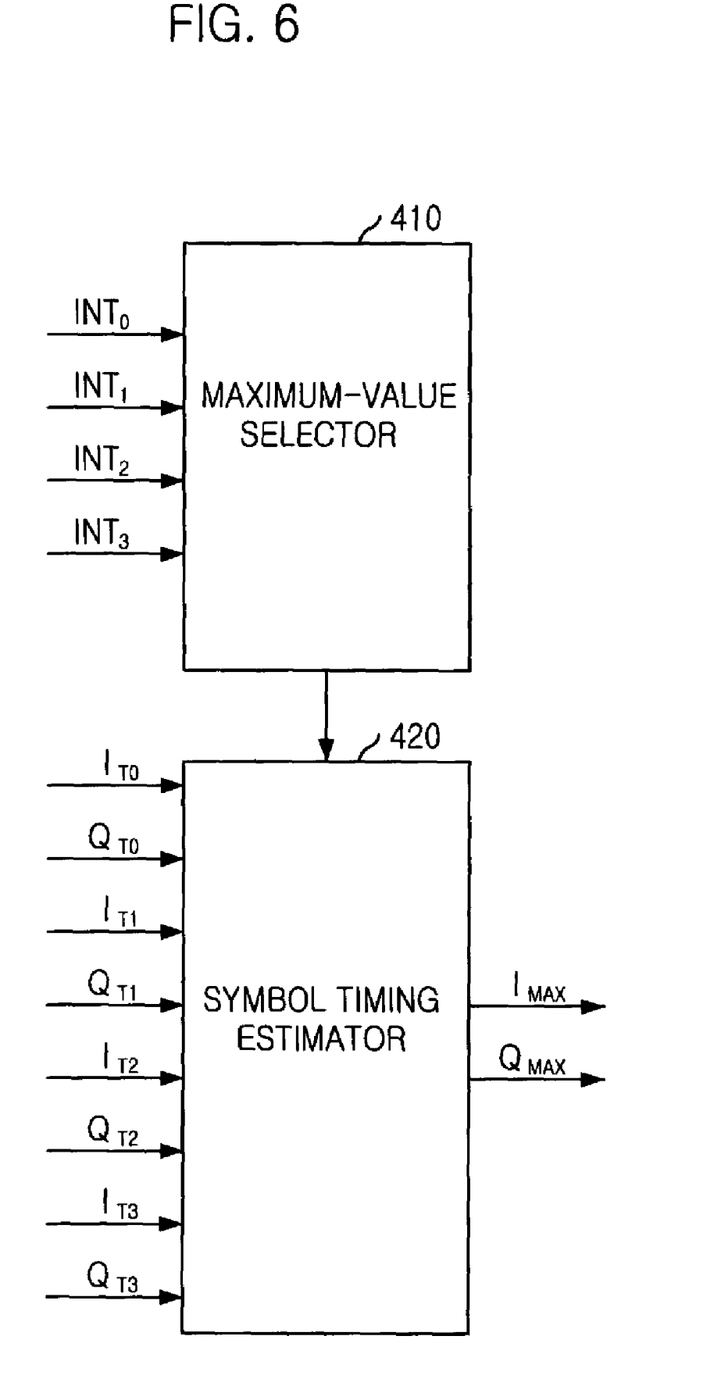
FIG. 6 is a detailed diagram illustrating a symbol synchronizer 40 of FIG. 1 in accordance with a preferred embodiment of the present invention.

FIG. 6 is a diagram illustrating the symbol synchronizer 40 of FIG. 1 in accordance with a preferred embodiment of the present invention.

Referring to FIG. 6, the symbol synchronizer 40 includes a maximum-value selector 410 and a symbol timing estimator. The maximum-value selector 410 selects a maximum-value timing index by comparing the integrated values of the integrator 30 and outputs the maximum-value timing index to the symbol timing estimator 420. The symbol timing estimator 420 predicts a point of symbol synchronization based on the maximum-value timing index and outputs two values of the point of symbol synchronization ($I_{max}$ and $Q_{max}$).

That is, the symbol synchronizer 40 selects and outputs the maximum value among the integrated values outputted from the symbol integrators 350 to 380. The maximum-value selector 410 finds the maximum value of the received preamble, which is represented as the sine wave.

Figure 7A:
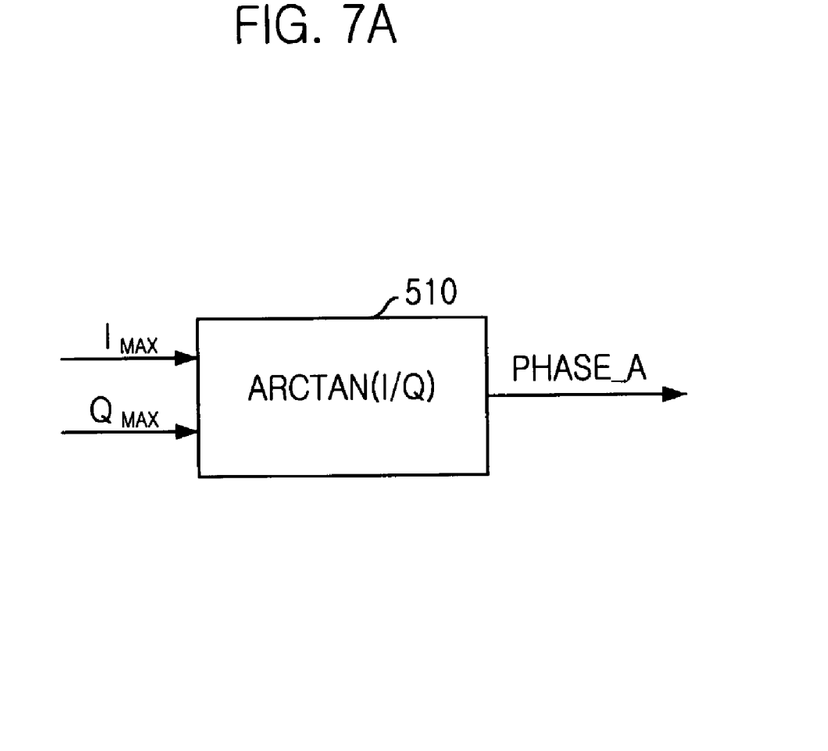
FIG. 7A is a detailed diagram showing a phase estimator 50 of FIG. 1 in accordance with a preferred embodiment of the present invention.

FIG. 7A is a diagram showing the phase estimator 50 of FIG. 1 in accordance with a preferred embodiment of the present invention. The phase estimator 50 estimates a phase error by receiving the values ($I_{max}$ and $Q_{max}$) and applying the values into $$\arctan\left\{\frac{\sin\varpi_P T_0 \cdot \cos(\Delta\varpi T_0 + \theta)}{\sin\varpi_P T_0 \cdot \sin(\Delta\varpi T_0 + \theta)}\right\}.$$

If a maximum value is calculated at a phase of $T_0$, a value of a phase error (Phase_a) is calculated by below equation.

$$\text{Phase\_a} = \arctan\left\{\frac{\sin\varpi_P T_0 \cdot \cos(\Delta\varpi T_0 + \theta)}{\sin\varpi_P T_0 \cdot \sin(\Delta\varpi T_0 + \theta)}\right\} = \Delta\varpi T_0 + \theta \quad \text{Eq. 6}$$

If there is no error, the phase $\theta$ can be calculated from Eq. 6.

Figure 7B:
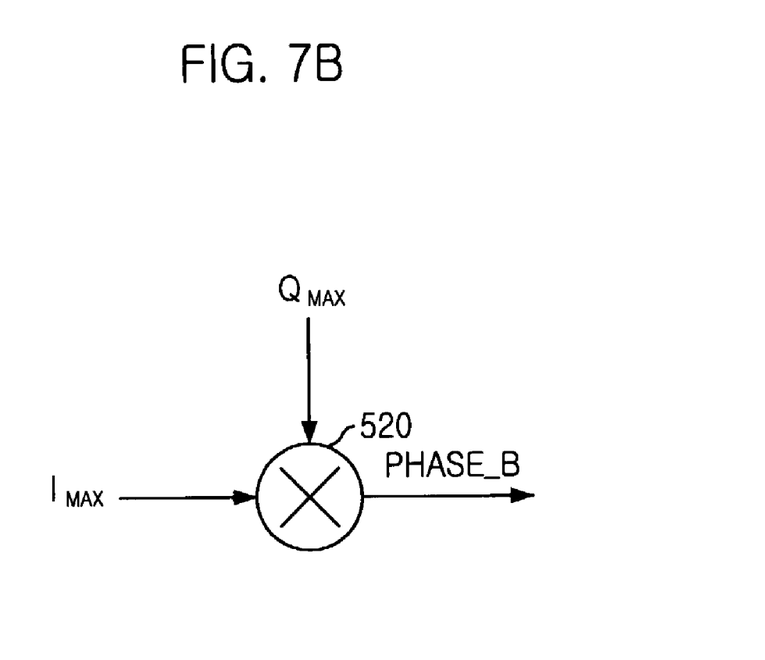
FIG. 7B is a detailed diagram illustrating the phase estimator 50 of FIG. 1 in accordance with another embodiment of the present invention.

FIG. 7B is a diagram illustrating the phase estimator 50 of FIG. 1 in accordance with another embodiment of the present invention. The phase error is calculated by multiplying the two values ($I_{max}$ and $Q_{max}$) of the symbol timing estimator 420.

If a maximum value is calculated at a phase of $T_0$, a value of phase of error (Phase_b) can be expressed as below equation.

$$\text{Phase\_b} = \sin^2\varpi T_0 \cdot \cos(\Delta\varpi T_0 + \theta) \cdot \sin(\Delta\varpi T_0 + \theta) \quad \text{Eq. 7}$$
$$\approx \frac{C}{2}\sin 2(\Delta\varpi T_0 + \theta)$$

-continued
$$\approx 2(\Delta\varpi T_0 + \theta)$$

In Eq. 7, it assumes $\sin^2 \tilde{\omega}_p T_0$ has constant values. If a frequency error is ignored, the phase $\theta$ can be calculated in Eq. 7.

Figure 8:
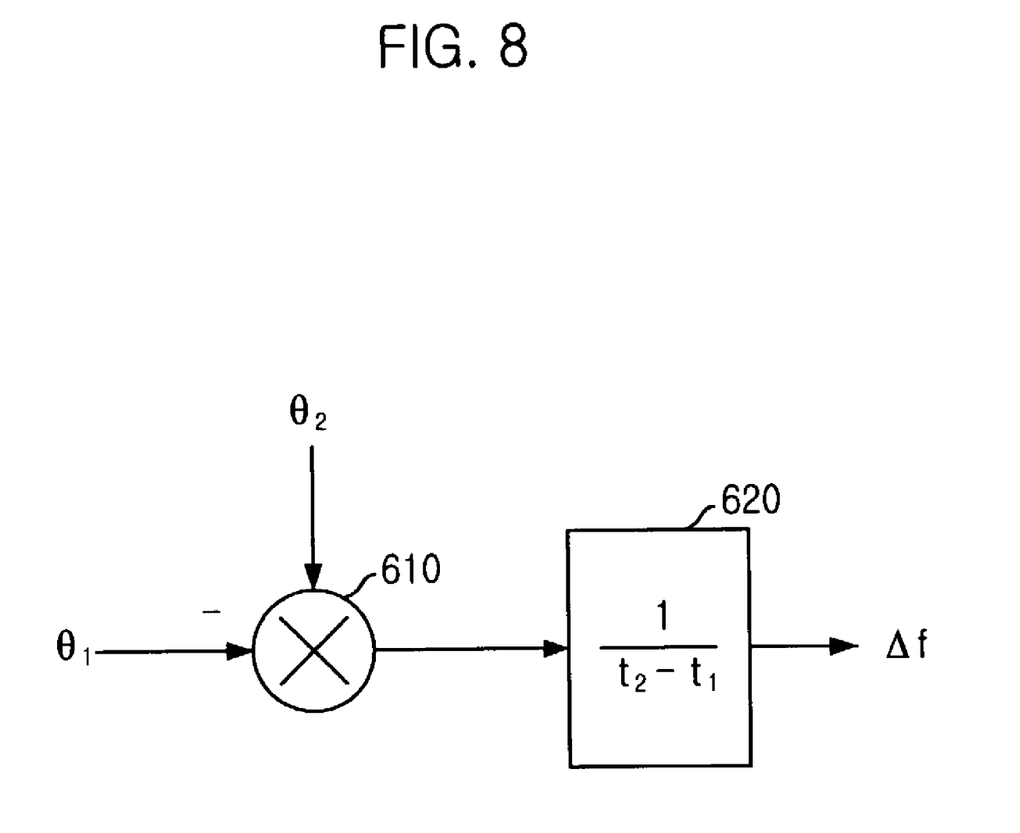
FIG. 8 is a detailed diagram showing a frequency estimator 60 of FIG. 1 in accordance with a preferred embodiment of the present invention.

FIG. 8 is a diagram showing the frequency estimator 60 of FIG. 1 in accordance with a preferred embodiment of the present invention. The frequency estimator 60 monitors output values of the phase estimator 50 for a predetermined time and detect the frequency error according to a result of monitoring.

The frequency error can be easily calculated by calculating a phase variation, and a performance of calculation depends on a phase monitoring time and a monitoring interval according to a length of the preamble. However, in the present invention, the performance is not analyzed.

The digital receiver of the present invention has simple hardware configuration comparing to a conventional receiver in the digital communication system and estimates the symbol timing error and frequency and phase in a digital receiver without complicated analog controls. Also, the present invention can synchronize the symbols if there are the frequency errors.

Moreover, the present invention can be implemented in a burst mode communication system since a closed circuit controlling method is not used in the present invention.

While the present invention has been described with respect to certain preferred embodiments, it will be apparent to those skilled in the art that various changes and modifications may be made without departing from the scope of the invention as defined in the following claims.

What is claimed is:

1. A receiving apparatus of a digital communication system, comprising:
    A/D converting means for performing an over-sampling process to convert an analog signal inputted from a transmitter to a digital signal and outputting over-sampled symbols;
    sample classifying means for classifying the over-sampled symbols of which phases are the same based on a phase of the over-sampled symbol in a symbol interval and outputting classified symbols;
    integrating means for accumulating values of the classified symbols by adding each value of the classified symbols for a predetermined time and outputting integrated values, the integrating means includes a plurality of complex envelop calculators for calculating absolute values of the classified symbols of an I-channel and a Q-channel in every symbol interval and outputting the absolute values;
    symbol synchronizing means for selecting a point of symbol synchronization based on the integrated values and the classified symbols and outputting a first value, which is a maximal value of the point of symbol synchronization;
    phase estimating means for estimating a phase error based on the first value and outputting a second value of an estimated phase error;
    frequency estimating means for estimating a frequency error based on the second value and outputting a third value of an estimated frequency error; and
    digital demodulating means for performing a demodulation by using the first value, the second value and the third.

2. The apparatus as recited in claim 1, wherein the A/D converting means includes an I-channel A/D converter and a Q-channel A/D converter and the sample classifying means includes an I-channel sample classifying means and a Q-channel sample classifying means in order to prevent a frequency error and a phase error.

3. The apparatus as recited in claim 1, wherein the integrating means further includes:
    a plurality of symbol integrators for accumulating the absolute values for a predetermined time by adding each absolute value of correspondent symbol intervals.

4. The apparatus as recited in claim 1, wherein the symbol synchronizing means includes:
    a maximum value selector for selecting a maximum timing index by comparing the integrated values and outputting the maximum timing index; and
    a symbol timing estimator for estimating a point of symbol synchronization by using the maximum timing index and outputting symbol values of the point of symbol synchronization.

5. The apparatus as recited in claim 1, wherein the phase estimating means estimates a phase error by calculating an arctan value by using the symbol values of the I-channel and the Q-channel of the symbol timing estimator.

6. The apparatus as recited in claim 1, wherein the phase estimating means estimates a phase error by multiplying the symbol values of the I-channel and the Q-channel of the symbol timing estimator.

7. The apparatus as recited in claim 1, wherein the frequency estimating means estimates a frequency error by monitoring the second values in predetermined time.

8. The apparatus as recited in claim 1, wherein the transmitter uses a sinusoid wave as a preamble and the receiver choose one of the over-sampled points of the sinusoid wave for synchronization.

9. A receiving method for a digital communication system, comprising the steps of:
    a) performing an over-sampling process to convert an analog signal inputted from a transmitter to a digital signal and outputting over-sampled symbols;
    b) classifying the over-sampled symbols of which phases are the same based on a phase of the over-sampled symbol in one symbol interval and outputting classified symbols;
    c) accumulating values of the classified symbols by adding each value of the classified symbols for a predetermined time and outputting integrated values and calculating absolute values of the over-sampled symbols of an I-channel and a Q-channel, said accumulating includes accumulating the absolute values for predetermined time by adding each absolute value of correspondent symbol interval;
    d) selecting a point of symbol synchronization based on the integrated values and the classified symbols and outputting a fourth value, which is a maximal value of the point of symbol synchronization;
    e) estimating a phase error based on the first value and outputting a fifth value of an estimated phase error;
    f) estimating a frequency error based on the second value and outputting a sixth value of an estimated frequency error; and
    g) performing demodulation by using the fourth value, the fifth value and the sixth value.

10. The method as recited in claim 9, wherein the step a) and the step b) are individually performed for an I-channel and a Q-channel in order to prevent a frequency error and a phase error.

11. The method as recited in claim 9, wherein the step d) obtains a maximum timing index by comparing the integrated values, estimates a point of symbol synchronization by using the maximum time index and outputs symbol values of the point of symbol synchronization.

12. The method as recited in claim 11, wherein the step e) estimates a phase error by calculating an arctan value by using the symbol values of the point of symbol synchronization.

13. The method as recited in claim 11, wherein the step e) estimates a phase error by multiplying the symbol values of the point of symbol synchronization.

14. The method as recited in claim 13, wherein the step f) estimates a frequency error by monitoring the fifth value of the step e) for a predetermined time.

15. The method as recited in claim 10, wherein the transmitter uses a sinusoid wave as a preamble and the receiver choose one of the over-sampled points of the sinusoid wave for synchronization.

* * * * *